US011359927B2

(12) United States Patent
Wolcott

(10) Patent No.: US 11,359,927 B2
(45) Date of Patent: Jun. 14, 2022

(54) MAPPING OF TEMPORAL ROADWAY CONDITIONS

(71) Applicant: Toyota Research Institute, Inc., Los Altos, CA (US)

(72) Inventor: Ryan W. Wolcott, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 256 days.

(21) Appl. No.: 16/035,992

(22) Filed: Jul. 16, 2018

(65) Prior Publication Data

US 2020/0018612 A1 Jan. 16, 2020

(51) Int. Cl.
*G01C 21/32* (2006.01)
*G01C 21/34* (2006.01)
*G01C 21/36* (2006.01)
*G08G 1/01* (2006.01)

(52) U.S. Cl.
CPC ..... *G01C 21/3492* (2013.01); *G01C 21/3691* (2013.01); *G08G 1/0112* (2013.01)

(58) Field of Classification Search
CPC ............ G01C 21/3492; G01C 21/3691; G08G 1/0112
See application file for complete search history.

(56) References Cited

U.S. PATENT DOCUMENTS

| | | | |
|---|---|---|---|
| 7,508,321 B2 | 3/2009 | Gueziec et al. | |
| 2001/0032236 A1* | 10/2001 | Lin | G01C 21/26 709/203 |
| 2007/0197231 A1* | 8/2007 | Lin | G08G 1/123 455/456.1 |
| 2009/0043486 A1 | 2/2009 | Yang et al. | |
| 2009/0157566 A1 | 6/2009 | Grush | |
| 2013/0151088 A1 | 6/2013 | Ricci | |
| 2013/0158821 A1 | 6/2013 | Ricci | |
| 2013/0166188 A1* | 6/2013 | Zheng | G06K 9/00624 701/117 |
| 2015/0120174 A1* | 4/2015 | Lewis | G08G 1/0112 701/118 |
| 2015/0266455 A1 | 9/2015 | Wilson | |
| 2016/0189544 A1 | 6/2016 | Ricci | |
| 2018/0342156 A1* | 11/2018 | Martin | G08G 1/0145 |
| 2019/0187723 A1* | 6/2019 | Tao | G08G 1/0145 |
| 2019/0234752 A1* | 8/2019 | Volos | G05D 1/0285 |
| 2020/0056903 A1* | 2/2020 | Tanizaki | G08G 1/096775 |

* cited by examiner

*Primary Examiner* — Mathew Franklin Gordon
(74) *Attorney, Agent, or Firm* — Christopher G. Darrow; Darrow Mustafa PC

(57) ABSTRACT

The systems and methods described herein disclose detecting events in a vehicular environment using vehicle behavior. As described here, vehicles, either manual or autonomous, that detect an event in the environment will operate to respond to the event. As such, those movements can be used to determine if an event has occurred, even if the event cannot be determined directly. The systems and methods can include collecting detection data about a vehicle behaviors in a vehicular environment. Event behaviors can then be selected from the vehicle behaviors. A predicted event can be formulated based on the event behaviors. The predicted event and an event location can be associated in the vehicular environment. A guidance input can then be formulated for a recipient vehicle. Finally, a recipient vehicle can be navigated using the guidance input.

20 Claims, 7 Drawing Sheets

US 11,359,927 B2

MAPPING OF TEMPORAL ROADWAY CONDITIONS

TECHNICAL FIELD

Embodiments described herein generally relate to navigation of vehicles. More specifically, the embodiments generally relate to systems and methods of avoiding roadway hazards and difficulties during driving.

BACKGROUND

Operation of a vehicle is part of everyday life in modern society. As such, drivers and autonomous vehicles can benefit from being aware of changes which occur to the roads. Roadways can often change for a vehicle operator. Over a period of days or hours, a road, or portions thereof, can go from being traversable to being enter construction. Available signs and indications of roadway changes may be inadequate. Some roadway events may not be addressed by signs or other available indications, due to the transient nature of the event.

SUMMARY

The systems and methods described herein include the mapping of transient events in a roadway. In one embodiment, an event detection system for determining vehicle position is disclosed. The event determination system can include one or more processors; and a memory communicably coupled to the one or more processors. The memory can store a collection module including instructions that when executed by the one or more processors cause the one or more processors to collect, using a plurality of vehicles, detection data about a plurality of vehicle behaviors in a vehicular environment. The memory can further store an event determination module including instructions that when executed by the one or more processors cause the one or more processors to select a plurality of event behaviors from the plurality of vehicle behaviors, the plurality of event behaviors comprising a temporal connection, and to formulate a predicted event based on the plurality of event behaviors. The memory can further store a response module including instructions that when executed by the one or more processors cause the one or more processors to associate the predicted event and an event location in the vehicular environment, to formulate, using the predicted event and the event location, a guidance input for a recipient vehicle, and to navigate a recipient vehicle using the guidance input.

In another embodiment, a non-transitory computer-readable medium for determining vehicle position is disclosed. The non-transitory computer-readable medium can store instructions that when executed by one or more processors cause the one or more processors to collect, using a plurality of vehicles, detection data about a plurality of vehicle behaviors in a vehicular environment. The non-transitory computer-readable medium can further store instructions to select a plurality of event behaviors from the plurality of vehicle behaviors, the plurality of event behaviors comprising a temporal connection. The non-transitory computer-readable medium can further store instructions to formulate a predicted event based on the plurality of event behaviors. The non-transitory computer-readable medium can further store instructions to associate the predicted event and an event location in the vehicular environment. The non-transitory computer-readable medium can further store instructions to formulate, using the predicted event and the event location, a guidance input for a recipient vehicle. The non-transitory computer-readable medium can further store instructions to navigate a recipient vehicle using the guidance input.

In another embodiment, a method for determining vehicle position is disclosed. The method can include collecting, using a plurality of vehicles, detection data about a plurality of vehicle behaviors in a vehicular environment. The method can further include selecting a plurality of event behaviors from the plurality of vehicle behaviors, the plurality of event behaviors comprising a temporal connection. The method can further include formulating a predicted event based on the plurality of event behaviors. The method can further include associating the predicted event and an event location in the vehicular environment. The method can further include formulating, using the predicted event and the event location, a guidance input for a recipient vehicle. The method can further include navigating a recipient vehicle using the guidance input.

Embodiments of the present application can be more clearly understood with relation to the figures and the description below.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Systems and methods described herein use observations about a vehicular environment from a plurality of vehicles to determine the existence and location of transient temporal events. The systems and methods can provide information by leveraging observations of a plurality of vehicles. The observations can occur both in real-time and over an extended period of time (e.g., hours, days, months, etc.). The collected information from the observations can be modeled to determine transient temporal aspects of the roadway, such as when lanes are restricted because of HOV requirements, standard divergence of vehicles from a selected path, and so on. Moreover, the systems and methods also provide for a real-time reporting aspect, which can include collecting information about whether a lane is not traversable because of snow, an accident, or some other hazard and updates the map in real-time to reflect the condition.

In embodiments described herein, the systems and methods receive information from a plurality of vehicles about whether separate lanes on a road are traversable, including mapping of lanes as used by the vehicles, and updates the map accordingly. In some embodiments, the updated information can be presented to vehicles as part of the systems or methods in a variety of ways. In some examples, the information can be presented by being pushed or uploaded to vehicles, the vehicles can periodically query the mapping service, such as according to a vehicle location, the vehicles can update by determining whether updates are present followed by upload of present data, or others. In this way, the disclosed systems and methods provide for additional situational awareness about the usability of individual lanes of the road. Embodiments of the present application can be more clearly understood with relation to the figures and the description below.

Figure 1:
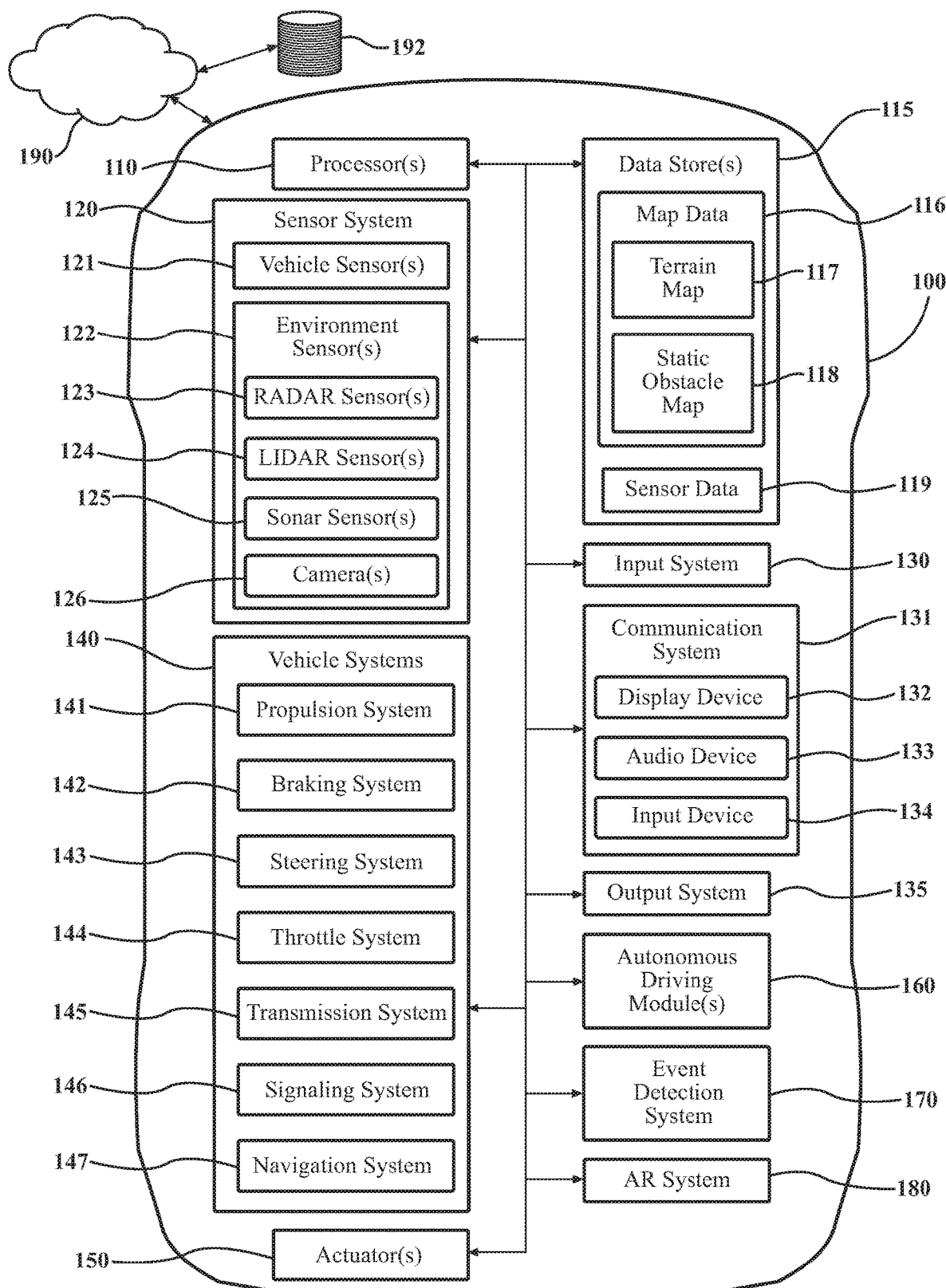
FIG. 1 is a block diagram of a vehicle useable as part of an event detection system, according to embodiments described herein.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate autonomously, semi-autonomously, or manually by an in-vehicle operator. The vehicle 100 can include an event detection system 170 or capabilities to support an event detection system 170, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5B for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a more thorough understanding of the embodiments described herein. Those of skill in the art, however, will understand that the embodiments described herein may be practiced using various combinations of these elements.

Figure 2:
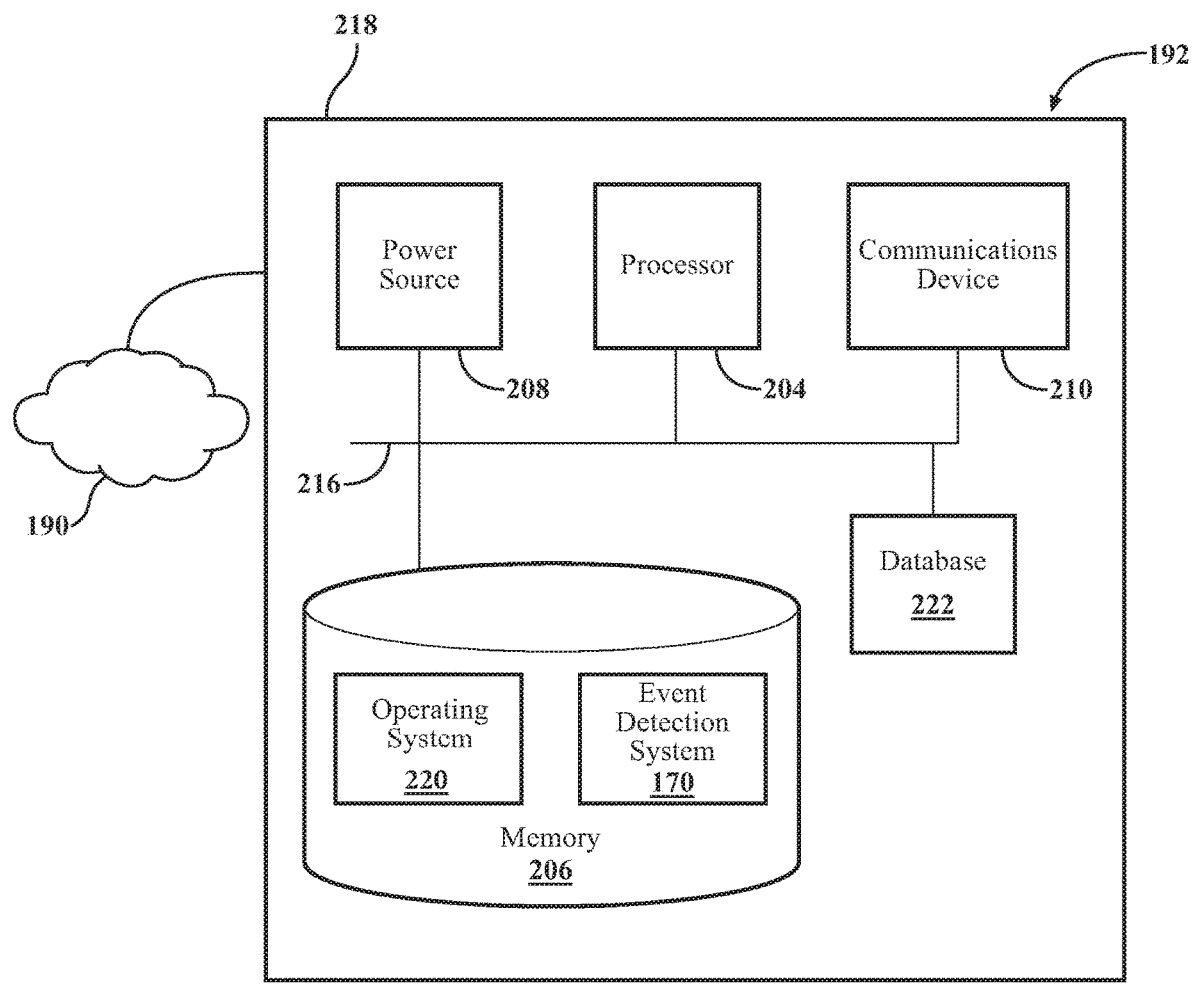
FIG. 2 is a block diagram of a server useable as part of the event detection system, according to embodiments described herein.

FIG. 2 is a block diagram of the server 192, as shown in FIG. 1, according to one or more embodiments. The server 192 can contain various components for performing the functions that are assigned to said server. The components can include a processor 204, a memory 206, a power source 208, communications device 210, input and/or output devices, and at least one bus 216 that connects the aforementioned components. In some embodiments, these components are at least partially housed within a housing 218.

The processor 204, which can also referred to as a central processing unit (CPU), can be a device which is capable of receiving and executing one or more instructions to perform a task as part of a computing device. In one embodiment, the processor 204 can include a microprocessor such as an application-specific instruction set processor (ASIP), graphics processing unit (GPU), a physics processing unit (PPU), a digital signal processor (DSP), an image processor, a co-processor, or others. Though referenced as the processor 204, it is understood that one or more processors 204 can be used in one or more embodiments described herein, including combinations of processors 204.

The memory 206 can include volatile and/or non-volatile memory. The memory 206 can further include a computer readable storage medium. Examples of suitable memory 206 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 206 can be a component of the processor(s) 204, or the memory 206 can be operably connected to the processor(s) 204 for use thereby. The memory 206 can include an operating system 220, such as LINUX. The operating system 220 can include batch, live, time sharing, real time, and other types of operating systems. The operating system 220, as described herein, can include instructions for processing, accessing, writing, storing, searching data, or other functions as selected by the user for controlling and providing interface with the server 192. The memory 206 can include communications procedures for communicating with the network 190, computing devices, a vehicle 100, and/or another server.

The communication device 210 can be wired or wireless connection components and/or software allowing the server 192 to communicate with other computing devices. The communication device 210 can allow communication with devices either locally or remotely, such as over a network protocol (e.g., Ethernet or similar protocols). In one example, the server 192 is connected to the network 190 using the communication device 210. The communication device 210 can further be connected with remote devices associated with other computing devices. In one example, the communication device 210 is connected with the sensors system 120 and the data store 115 through the vehicle 100. In further embodiments, the server 192 can connect with a second server, allowing access to one or more sensors, which are connected to or in connection with the second server. The one or more sensors can include one or more of the sensors of the sensor system 120, described with reference to FIG. 1.

The server 192 can further include the event detection system 170 or components thereof. As described herein, certain components of the event detection system 170 can be stored in the vehicle 100, in the server 192 or in combinations thereof. As such, one or more embodiments of the event detection system 170 can include the event detection system 170, modules thereof, or components thereof as being stored, collected, created, compared or otherwise made available from the memory 206 or the database 222 of the server 192. When stored as part of the server 192, the event detection system 170 can access the vehicle 100, another server 192, one or more sensors, or other devices through the communications device 210 and the network 190, allowing for continuity between the one or more components which comprise the event detection system 170, as disclosed herein.

Figure 3:
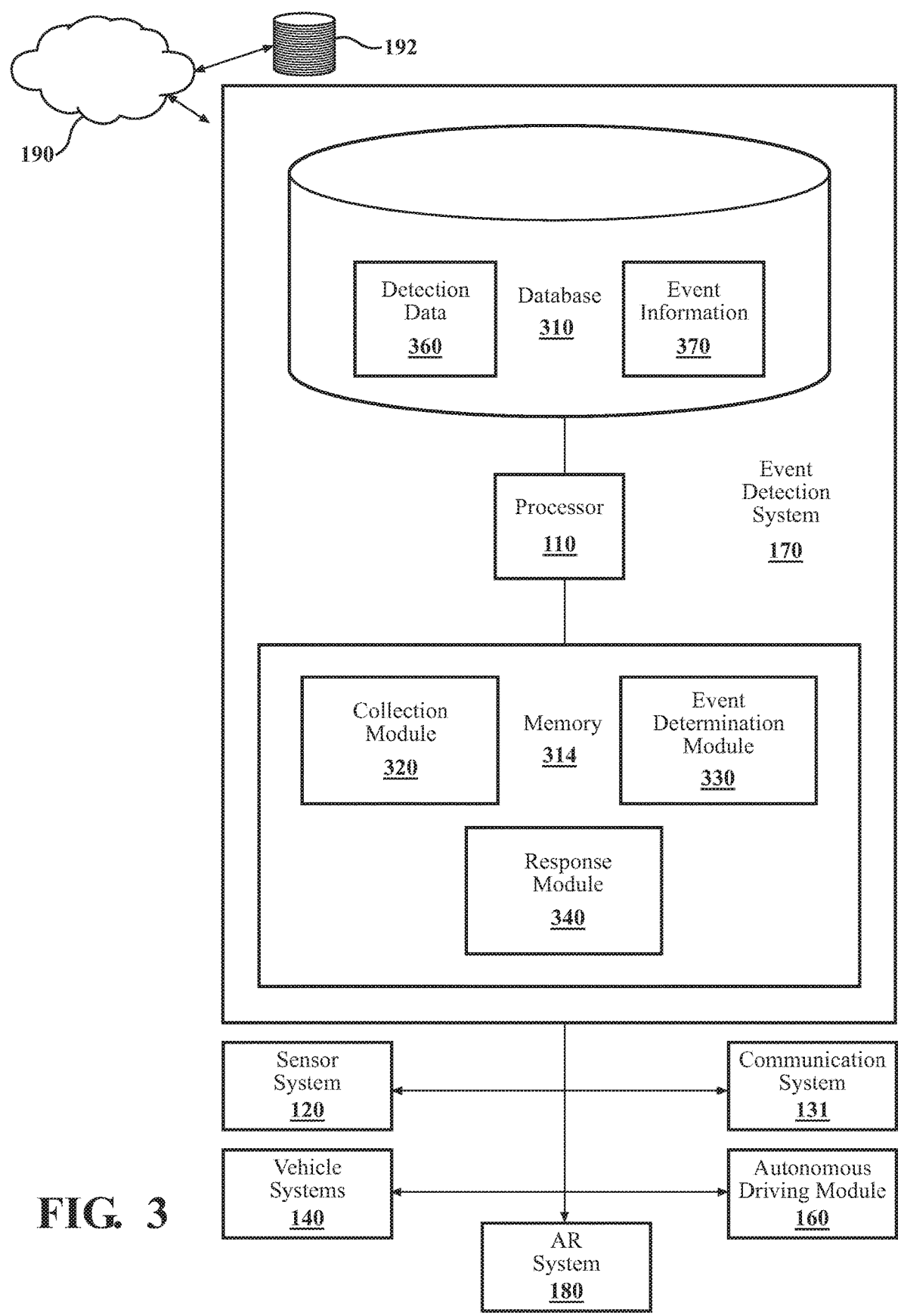
FIG. 3 is an illustration of the event detection system for detection of transient temporal events, according to embodiments described herein.

The discussion of the event detection system 170 begins at FIG. 3, with an illustration of the event detection system 170, according to one embodiment. The event detection system 170 is shown as including the processor 110 from the vehicle 100, depicted in FIG. 1. Accordingly, the processor 110 can be a part of the event detection system 170, the event detection system 170 can include a separate processor from the processor 110 or the event detection system 170 can access the processor 110 through a data bus or another communication path. In one embodiment, the event detection system 170 includes the memory 314 that stores a collection module 320, an event determination module 330 and a response module 340. The memory 314 is a random-access memory (RAM), read-only memory (ROM), a hard-disk drive, a flash memory, or other suitable memory for storing the modules 320, 330, and 340. The modules 320, 330, and 340 are, for example, computer-readable instructions that when executed by the processor 110, cause the processor 110 to perform the various functions disclosed herein.

The event detection system 170 can further include a database 310. The database 310 can be presented in a number of configurations, including as part of the memory 314, as an independent component from the memory 314, as part of a separate memory (distinct from memory 314), or others. The database 310 can include detection data 360 and event information 370. The detection data 360 can include data and information as detected from the vehicular environment by one or more sources, such as from a plurality of detecting vehicle. The detection data 360 can include data from multiple vehicles, as transmitted through a network 190 from a server 192, as well as data collected from one or more sensors, such as from a sensor system 120. The event information 370 can include information related to a temporal event, including an event type, an event location, an anticipated time frame for the event, and others. Though the event detection system 170 is shown as part of the vehicle 100, the event detection system 170 or portions thereof, can be stored in a separate vehicle, on a computing device, such as the server 192, or others. As such, one or more of the functions of the event detection system 170 or the modules contained therein, can be performed remotely and transferred to vehicle 100 as part of the embodiments described herein.

The collection module 320 can generally include instructions that function to control the processor 110 to collect, using a plurality of detecting vehicles, detection data 360 about a plurality of vehicle behaviors in a vehicular environment. The plurality of detecting vehicles are vehicles which exist within the vehicular environment and collect data including a plurality of vehicle behaviors using one or more sensors. The vehicle behaviors are a collections of positions and maneuvers collected from the plurality of vehicles indicating road position and changes therein over a period of time. The vehicle behaviors can be used to indicate choices made in the vehicular environment due to one or more temporal events. Temporal events, as used herein, refers to events which occur in an unplanned or unexpected manner and will generally only last for a short time frame. The vehicle behaviors can indicate which lane a vehicle was in, avoidance maneuvers, type of control of the vehicles (e.g., autonomous or manual), time frames for both positions and maneuvers, and related sensor data as determined by the event detection system 170.

The vehicle behaviors can be collected using available systems which allow for either detection or inference of vehicle behavior by the event detection system 170. In one example, the collection module 320 can receive information from the autonomous driving module 160 regarding an evasive maneuver of the detecting vehicle. In another example, the collection module 320 can receive indications of movement from the vehicle systems 140. In another example, the collection module 320 can infer or determine that movement has occurred through sensor data from the sensor system 120. The sensor system 120 can provide data to the collection module 320 automatically, based on specific events, upon request from the collection module 320, or upon request from another system or module. One skilled in the art will understand the breadth of detection or inference types described herein, without further recitation of specific examples.

The event determination module 330 can generally include instructions that function to control the processor 110 to select a plurality of event behaviors from the plurality of vehicle behaviors. As the plurality of vehicle behaviors occur over a period of time, the plurality of vehicles behaviors can include both event behaviors and behaviors unrelated to an event. The event behaviors are behaviors which are in response to or related to the existence of an event in the vehicular environment. It is understood that a first vehicle or an operator may detect events which are not detected by a second vehicle or a second operator. As such, by monitoring the behavior of a plurality of detecting vehicles, the event detection system 170 can detect events which might otherwise go unnoticed by any one detecting vehicle.

In this embodiment, the event determination module 330 is shown as part of the vehicle 100. Thus, the event determination module 330 can receive detection data from a plurality of vehicles, which can then be incorporated into determining the event behaviors. Event behaviors are vehicle behaviors which are performed in response to an event. The event detection system 170 can include connecting through a network 190 to an information source, such as another detecting vehicle or a computing device, such as the server 192. The network 190 can be any form of connection, such as a vehicle to vehicle (V2V) connection, an ad-hoc network, a vehicle to infrastructure (V2I) connection, wireless connection, relay connections or others. The detection data is then processed and compared to other detection data from nearby vehicles based on a temporal connection. The temporal connection, location connection, and action connection indicate an association between two behaviors, either intra- or inter-vehicle, indicating that they are related to the same event. An example of a temporal connections can include two vehicles swerving out of a middle lane, one to a left lane and one to a right lane, at the same time, to avoid something (i.e., the time element is what connects the behaviors, without further knowledge). The temporal connection can include a time component between an initial vehicle movement and a second vehicle movement. The time connection can be incorporated with other types of connections, such as a location connection, an action connection, or combinations thereof. An example of a location connections can include two or more vehicles avoiding the same location at different times, to avoid something (i.e., the location element acts alongside the time element to connect a behavior, without further knowledge). The relation of time, along with location and/or action, can be used to determine which vehicle behaviors are also event behaviors.

As the detection data is derived from a variety of sources (e.g., the plurality of detecting vehicles), a variety of processing schemes may be used such that the detection data is considered in determining the plurality of event behaviors. In some embodiments, data as processed from the detection data by a separate event determination module (e.g., the event determination module 330 on a different vehicle), is transmitted to the vehicle 100 for use in determining the plurality of event behaviors. In further embodiments, the detection data from the collection module 320 is transmitted to a remote computing device (e.g., the server 192) where the detection data is used to determine the plurality of event behaviors. The plurality of event behaviors being subsequently transmitted to the vehicle 100 through the network 190. Further combinations of the event detection system 170 and modules thereof being stored in local or remote locations for performance of the functions of the system described herein are envisioned without further explicit recitation of examples herein.

The event determination module 330 can further include instructions to formulate a predicted event based on the plurality of event behaviors. Once the plurality of event behaviors have been extracted from the plurality of vehicle behaviors, the event determination module 330 can then establish possible events. The determination of possible events can be based on sensor data (e.g., an object detected in the road), extrapolation from actions (e.g., the vehicles maneuvered as if to dodge a pothole), or others. In one embodiment, there may be more than one predicted event (e.g., there may be construction or snow blocking the right hand lane) or the predicted event may be generic (e.g., an object in the middle lane). In further, embodiments, the predicted event can be refined over time, using new information, such as from publically available sources, sensor data or others. The predicted event can be stored as part of the event information 370 in the database 310. Further, this information can be transferred to one or more detecting vehicles, to a server (e.g., the server 192) or others.

The response module 340 can generally include instructions that function to control the processor 110 to associate the predicted event and an event location in the vehicular environment. Here, the response module 340 can position the predicted event in an event location. The event location can be a precise location in the vehicular environment, including details such as lane level location of the event, boundaries affected by the event, parameters which defy lane boundaries, and others. The predicted event can then be positioned, based on knowledge level about the event and changes over time, in the event locations. This association can then be provided to the plurality of detecting vehicles, other autonomous vehicles, other manual vehicles (such as through a communication system 131 or an augmented reality system 180) or other mechanisms. The predicted event can then be used to update a map, including any known time frames. In one example, a lane is inaccessible due to snow but the temperature is predicted to rise above 50 degrees during the day, as such the response module 340 can determine that the predicted event will not affect the vehicular environment after a certain time in the afternoon and update the map with said information.

Further, predicted events can be correlated through the response module 340 to other predicted or known events. The predicted event at an event location may have other associated events which affect the vehicular environment. The response module can use parameters such as type of event, timing, location, and others to determine that events are associated in the vehicular environment. In one example, the response module 340 determines that a piece of construction equipment is in the center lane. The response module 340 can, through a variety of mechanisms (e.g., publically available information), detect an accident involving a construction vehicle within specific distance of the predicted event, thus determining that the construction vehicle and the predicted event are related events. Further correlations between the predicted event and the vehicular environment can be formed, using the embodiments disclosed herein.

The response module 340 can further include instructions to formulate, using the predicted event and the event location, a guidance input for a recipient vehicle. The guidance input is one or more steps which the operator or the autonomous vehicle can take to avoid being affected by the predicted event. The guidance input can be related to the type of event, the predicted effects of the event on traffic in the vehicular environment, the likelihood that the predicted event will be cleared, the location of the event, the availability of alternative routes, and others. The guidance input can include a specific route, lanes to avoid or position in, expectations regarding traffic patterns, traffic movements outside of normal lane patterns, or others. Further, the guidance input can include related temporal data collected over time, such as specific events, lane level events which occur with some known frequency or others.

The response module 340 can further include instructions to navigate a recipient vehicle using the guidance input. The response module 340 can navigate the vehicle either directly or indirectly based on operator input, vehicle type (e.g., autonomous or manual) or other control factors. In one embodiment, the response module 340 can directly take control of the vehicle, such as when the guidance input is presented as instructions to the vehicle systems 140 and controls one or more movements therein. In another embodiment, the response module 340 can indirectly control the vehicle, such as when the guidance input is presented as instructions to the autonomous driving module 160. In this case, the control is indirect in the sense that the autonomous driving module 160 can alter or deny inputs from the response module 340. In another embodiment, the guidance input can be presented as an option for the operator or passenger to act on, such as when the guidance input is presented to an operator as instructions/route, or when presented as inputs which can be selected or provided by a passenger.

Figure 4:
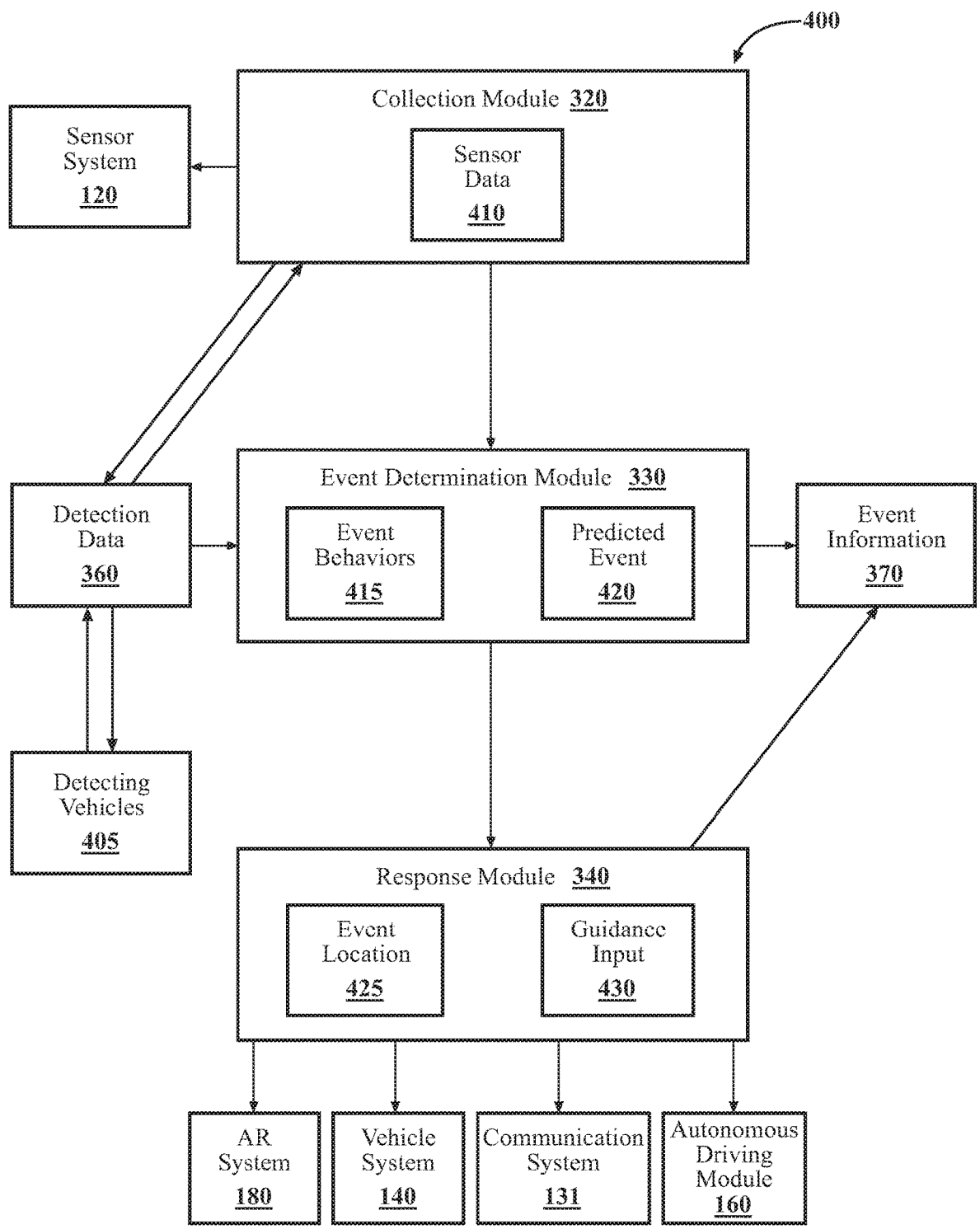
FIG. 4 is a schematic of the event detection system, according to one or more embodiments.

FIG. 4 depicts a schematic 400 of the event detection system 170, according to one or more embodiments. The event detection system 170 detects a plurality of vehicle behaviors in the vehicular environment through the collection module 320. The plurality of vehicle behaviors can then be compared to determine if one or more vehicle behaviors relate to an event (e.g., an event behavior) and predict the event using the event determination module 330. Once compared, the response module 340 can determine the location range of the event (i.e., the event location) in the vehicular environment. As well, the response module 340 can provide instructions for avoidance of the event, as appropriate. Thus, through the use of the event detection system 170, the vehicle can use detected vehicle behavior from a plurality of vehicles to detect unpredictable temporal events in the vehicular environment.

As shown here, the schematic 400 begins with the collection module 320 of a vehicle 100 collecting sensor data 410 using a sensor system 120. The sensor data 410 can include the plurality of vehicle behaviors for a plurality of detecting vehicles 405 as well as other vehicles in the vehicular environment. The plurality of detecting vehicles 405 can include a collection module 320 which also collects sensor data 410 using one or more sensors of a sensor system, such as the sensor system 120. The plurality of detecting vehicles 405 can be substantially similar to the vehicle 100 described with reference to FIG. 1. The plurality of detecting vehicles 405, including the vehicle 100, can then store the sensor data 410 as detection data 360. The detection data 360 can be stored in a database, such as the database 310, described with reference to FIG. 3. The detection data 360 can further be stored or copied for storage at a remote site, such as a server The detection data 360 can further be accessed by the collection module 320 to forward detection data 360 to the event determination module 330. The event determination module 330 accesses or receives the detection data 360. The detection data 360 is then analyzed to determine one or more event behaviors 415 in the detection data 360. The event behaviors 415 can indicate an event in the vehicular environment, such as an unpassable stretch or lane of the road, objects which affect vehicle travel or other events which change the behavior of a vehicle in the vehicular environment. The event behaviors 415 can then be used by the event determination module 330 to create a predicted event 420. The event behaviors 415 and the predicted event 420 can then be stored as part of the event information 370 and/or forwarded to the response module 340.

The response module 304 can then receive the event behaviors 415 and the predicted event 420 and determine an event location 425. In one or more embodiments, the event behaviors 415 and the predicted event 420 can set one or more boundaries for the event location. The predicted event 420 can provide an estimate of the size necessary for the event to exist or the likely size of the event, such as a car accident or a ladder lost from a truck in the road. The event behavior 415 can provide information on where the detecting vehicles 405 are marking the boundaries of the predicted event 420, such as the predicted vehicles swerving out of a specific lane at a fixed first point and moving back into the specific lane at a fixed second point. Using this information, the response module 340 can create an estimate of the boundaries of the event location 425, both laterally and along the lane.

With the event location 425 defined, the response module 340 can formulate guidance input 430 for the vehicle 100. The guidance input 430, as described above, can be a specific route for the vehicle 100 to follow which is expected to avoid or safely traverse the predicted event 420. The guidance input 430 can then be provided to the AR system 180 or the communication system 131, when presenting the guidance input 430 for a manually driven vehicle. In another embodiment, the guidance input 430 can be provided as instructions to the vehicle system 140 and/or the autonomous driving module 160, when presenting to an autonomous vehicle.

The event detection system 170 described herein can provide numerous benefits for both autonomous and non-autonomous vehicles. The event detection system 170 includes the crowdsourcing of vehicle action data, and determining which data correlates with an event in a vehicle environment. The event detection system 170 does not rely on visualizing or sensing the event itself, thus it does not suffer the same limitations regarding proximity, detection efficiency, or others. Further, the event detection system 170 can detect lane level events based on vehicle actions, allowing for determination of changes in the vehicular environment more quickly.

Figure 5A:
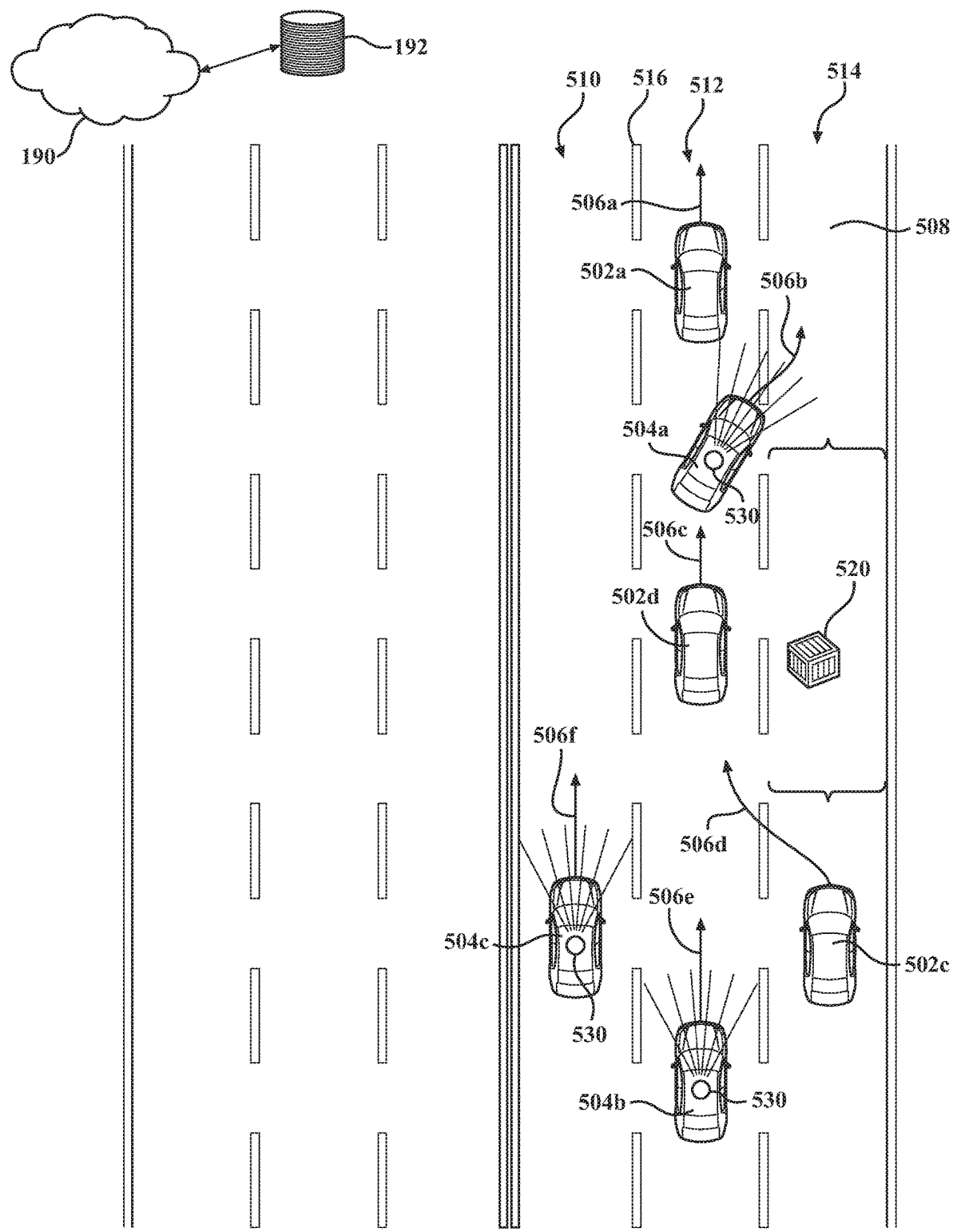
FIGS. 5A and 5B depicts an operator in a vehicle incorporating the event detection system, according to embodiments described herein.
Figure 5B:
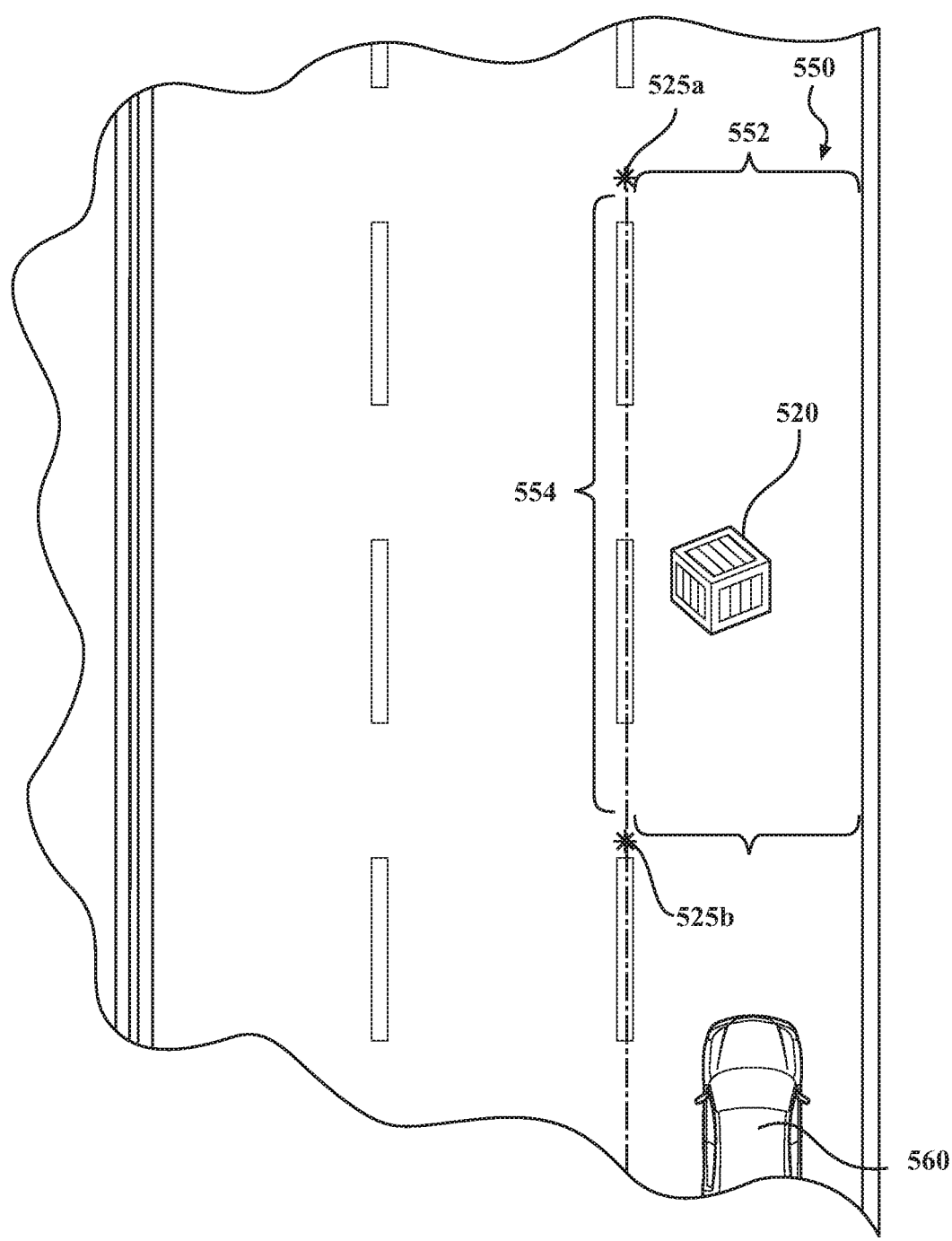

FIGS. 5A and 5B depict a plurality of vehicles in a vehicular environment 500 employing the event detection system 170, according to one or more embodiments. FIG. 5A depicts the vehicles in the vehicular environment 500, according to one embodiment. FIG. 5B depicts a close up of the event in the vehicular environment, according to one embodiment. The event detection system 170 detects vehicle behaviors to determine the existence of one or more events, including location and possible responses to said events. As shown here, the vehicular environment 500 includes a road 508 having a first lane 510, a second lane 512 and a third lane 514. The first lane 510, the second lane 512 and the third lane 514, as delineated by one or more road markings 516 are part of traffic patterns to control vehicle position and separation on the road 508. The vehicular environment 500 can further include a plurality of incidental vehicles, shown here as incidental vehicles 502a, 502b and 502c, and a plurality of detecting vehicles 504a, 504b, and 504c. The incidental vehicles 502a, 502b and 502c are vehicles which occur within the vehicular environment 500 and perform one or more vehicle behaviors, shown here as vehicle behaviors 506a, 506b, 506c, 506d, 506e, and 506f. Though the event detection system 170 is shown using the incidental vehicles 502a, 502b and 502c and the plurality of detecting vehicles 504a, 504b, and 504c, the number of incidental vehicles and detecting vehicles employed by the event detection system 170 can be any amount of detecting vehicles. Further, the vehicular environment 500 can include one or more traffic events, described here with relation to the event 520, depicted as a crate, in the third lane 514 of the road 508. As stated previously, the event detection system 170 and/or components thereof, can be stored in the one or more detecting vehicles 504a, 504b, and 504c, the server 192, or combinations thereof.

The event detection system 170 can begin with the vehicle behaviors 506a, 506b, 506c, 506d, 506e, and 506f. The collection module 320 of the event detection system 170 collects information on the vehicular environment 500 including detecting the vehicle behaviors 506a, 506b, 506c, 506d, 506e, and 506f. The vehicle behaviors 506a, 506b, 506c, 506d, 506e, and 506f can be detected using a sensor system, such as the sensor system 530. The sensor system 530 can be substantially similar to the sensor system 120, described with reference to the vehicle 100 in FIG. 1. Vehicle behaviors 506a, 506b, 506c, 506d, 506e, and 506f can further be determined or reported using one or more internal systems, such as the detecting vehicle 504a self-reporting regarding information the vehicle behaviors 506b of the detecting vehicle 504a.

As shown here, detection data on the vehicle behaviors 506a, 506b, 506c, 506d, 506e, and 506f can be collected from the sensor system 530 of plurality of detecting vehicles 504a, 504b, and 504c. In this example, the collection module 320 detects that the vehicle behavior 506a includes the incidental vehicle 502a continuing in the second lane 512. The collection module 320 further detects that the vehicle behavior 506b includes the detecting vehicle 504a switching from the second lane 512 to the third lane 514, with a transition point 525a between the second lane 512 and the third lane 514. The collection module 320 further detects that the vehicle behavior 506c includes the incidental vehicle 502b continuing in the second lane 512. The collection module 320 further detects that the vehicle behavior 506d includes the incidental vehicle 502c switching from the third lane 514 to the second lane 512, with a transition point 525b between the second lane 512 and the third lane 514. The collection module 320 further detects that the vehicle behavior 506e includes the detecting vehicle 504b continuing in the second lane 512. The collection module 320 further detects that the vehicle behavior 506f includes the detecting vehicle 504c continuing in the first lane 510. The vehicle behaviors 506a, 506b, 506c, 506d, 506e, and 506f can then be stored in a database, such as the database 310, and/or forwarded to the event determination module 330.

The event determination module 330 can then determine if one or more of the vehicle behaviors are event behaviors. The vehicle behaviors 506a, 506b, 506c, 506d, 506e, and 506f, as described above, are actions or maneuvers performed by the vehicles in the environment. Event behaviors are vehicle behaviors which are responsive to an event. As such, one or more of the vehicle behaviors 506a, 506b, 506c, 506d, 506e, and 506f can be an event behavior as well. As shown here, the detecting vehicle 504a and the incidental vehicles 502b and 502c, appear to be responding to an event in the third lane 514. The event determination module 330 can thus determine that the vehicle behaviors 506b, 506c, and 506d are event behaviors. The determination can be made based on the temporal connection and the location connection of the vehicle behaviors 506b, 506c, 506d. As shown here, the detecting vehicle 504a and the incidental vehicles 502b and 502c are performing the vehicle behaviors 506b, 506c, 506d in the same general location, during the same general time frame and around the same general space on the road, indicating that they are all acting in accordance with some detected event.

The movements of the vehicles, as included in the vehicle behaviors 506b, 506c, 506d can be used to determine the existence of an event type and, optionally, predict the event. Based on the movement of the detecting vehicle 504a and the incidental vehicles 502b and 502c, the event determination system 230 can determine that an event has occurred, such as an event 520 in the third lane 514 of the road 508. As shown, the detecting vehicle 504a and the incidental vehicles 502b and 502c are forming a space in the third lane 514, as shown by the avoidance of the region in the vehicle behaviors 506b, 506c, 506d. The event determination module 330 can determine that an event exists, even without viewing the region, such as with the vehicle behaviors 506b, 506c, 506d being received by the server 192 having the event determination module 330 as described herein. The predicted event at the event 520 can be related to the type of vehicle behavior, such as avoidance of a region indicates that the area of road cannot be safely driven on and may include a road hazard. The predicted event can be refined based on further information received, such as emergency scanners receiving information that an object has been dropped in the vicinity. This information can be correlated to the predicted event to refine the type of event predicted, however the predicted event need not precisely describe the event 520.

The response module 340 can then provide instructions to associate the predicted event and an event location 550. The event location 550 includes both the precise location of the event 520 and the area affected by the event 520. As shown in FIGS. 5A and 5B, the event location 550 has the event 520 at the center. The vehicle behaviors 506b, 506c, 506d indicate a length boundaries 552 and a lane boundary 554 of the event location 550. The length boundary 552 is the boundary of the event location 550 along the length of the road 508. The lane boundary 554 is the boundary of the event location 550 between the lanes. With consideration of nature of events, the length boundaries 552 and the lane boundary 554 may not follow or be restricted by the road markings 516. The detecting vehicle 504a and the incidental vehicle 502c crossing the transition point 525a and 525b can offer an indication of the length boundaries 552 and the lane boundary 554. The lane position of the incidental vehicle 502b can be used to refine the position of the lane boundary 554.

The response module 340 can then formulate a guidance input for a recipient vehicle 560. The recipient vehicle 560 is the vehicle which receives the information from the event detection system 170. The recipient vehicle 560 can be substantially similar to the vehicle 100, described with reference to FIG. 1. The response module 340 of the event detection system 170 can then apply the predicted event and the event location to determine the guidance input. The guidance input tells the recipient vehicle how the vehicle or operator should respond to avoid or safely traverse the event. As shown here, the recipient vehicle 560 receives a guidance input from the response module 340. In one embodiment, the guidance input is information delivered to the operator through the communication system 131 indicating that the recipient vehicle 560 should move from the third lane 514 to the second lane 512. In another embodiment, the guidance input is instructions to the autonomous driving module 160 for controlling the recipient vehicle 560, and moving from the third lane 514 to the second lane 512. The guidance input can include specific indications where the event is expected to begin and end, allowing the operator or the autonomous driving module 160 to change course appropriately.

The event detection system 170 can thus provide numerous benefits for the vehicles in the vehicular environment. The event detection system 170 does not require specific detection of the event to provide information for avoidance or safe traversal of said event. Thus, by using the event detection system 170, non-descript events can be detected and avoided by the recipient vehicle.

Figure 6:
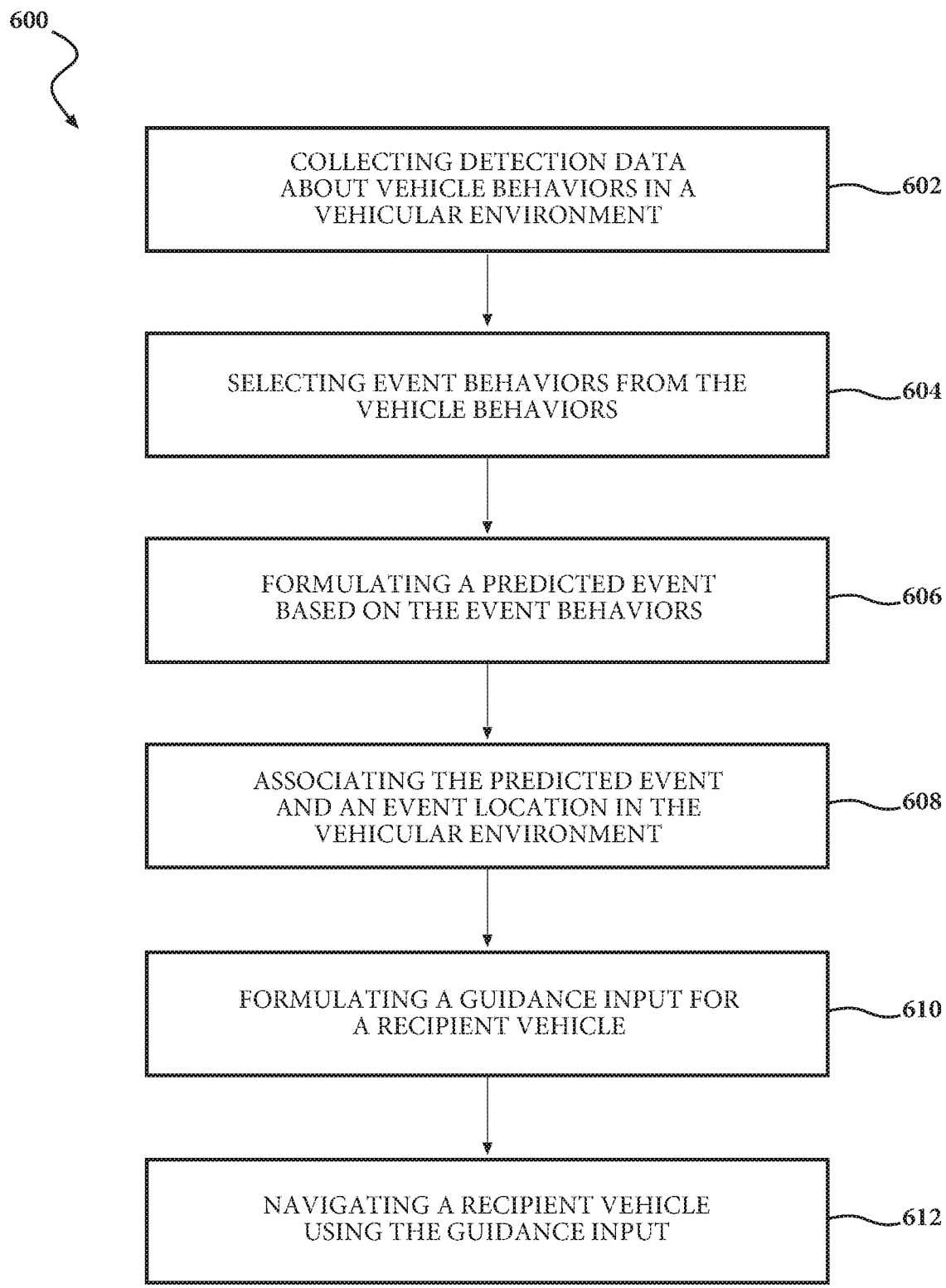
FIG. 6 is a block diagram of a method for detection of transient temporal events, according to one or more embodiments.

FIG. 6 is a block diagram of a method 600 for detection of transient events in an environment, according to one or more embodiments herein. The method 600 can include detection of vehicle behavior, determination of event behavior from the vehicle behavior, determining the event type and location and forming a guidance input for a recipient vehicle. Thus, the method 600 can respond to indeterminate temporal events and navigate the vehicle in a safe manner. As described herein, the method 600 can include collecting, using a plurality of detecting vehicles, detection data about a plurality of vehicle behaviors in a vehicular environment, at 602. A plurality of event behaviors can then be selected from the plurality of vehicle behaviors, at 604. A predicted event can then be formulated based on the plurality of event behaviors, at 606. The predicted event and an event location can then be associated in the vehicular environment, at 608. A guidance input can then be formulated for a recipient vehicle, using the predicted event and the event location, at 610. Finally, a recipient vehicle can then be navigated using the guidance input, at 612.

The method 600 can begin by collecting, using a plurality of detecting vehicles, detection data about a plurality of vehicle behaviors in a vehicular environment, at 602. The detecting vehicles, as described above, are vehicles which exist within the vehicular environment and collect data including a plurality of vehicle behaviors using one or more sensors. The vehicle behaviors are the movements and actions taken by one or more vehicles in the environment. The vehicle behaviors can be collected using available systems which allow for either detection or inference of vehicle behavior. The vehicle behaviors can be performed by any vehicles in the environment, such as detecting vehicles or incidental vehicles (i.e., any other vehicles in the vehicular environment). In one example, the method 600 can receive information regarding an evasive maneuver of the detecting vehicle. In another example, the method 600 can receive indications of movement in the detecting vehicle from the same detecting vehicle. In another example, the method 600 can infer or determine that movement has occurred through sensor data.

The detection of vehicle behaviors can be performed as part of a system, such as the event detection system 170, described with reference to FIG. 3. The event detection system 170 can include the collection module 320. The collection module 320 can generally include instructions that function to control the processor 110 to collecting, using a plurality of detecting vehicles, detection data about a plurality of vehicle behaviors in a vehicular environment. The vehicle behaviors can be substantially similar to the vehicle behaviors, described with reference to FIGS. 3 and 4. The vehicle behaviors can be stored as part of the detection data 260. The detection data 360 can be stored in a database, such as the database 310, described with reference to FIG. 3.

A plurality of event behaviors can then be selected from the plurality of vehicle behaviors, at 604. As the plurality of vehicle behaviors occur over a period of time, the plurality of vehicles behaviors can include both event behaviors and behaviors unrelated to an event. The event behaviors are behaviors which are in response to or related to the existence of an event in the vehicular environment. It is understood that a first vehicle or an operator may detect events which are not detected by a second vehicle or a second operator. As such, by monitoring the behavior of a plurality of detecting vehicles, the method 600 can detect events which might otherwise go unnoticed by any one detecting vehicle.

The method 600 can receive detection data from a plurality of vehicles, which can then be incorporated into determining the event behaviors. Event behaviors are vehicle behaviors which are performed in response to an event. The detection data is then processed and compared to other detection data from nearby vehicles based on a temporal connection. The temporal connection, location connection, and action connection indicate an association between two behaviors, either intra- or inter-vehicle, indicating that they are related to the same event. The temporal connection can include a time component between an initial vehicle movement and a second vehicle movement, as described above. The relation of time, along with location and/or action, can be used to determine which vehicle behaviors are also event behaviors. As the detection data is derived from a variety of sources (e.g., the plurality of detecting vehicles), a variety of processing schemes may be used such that the detection data is considered in determining the plurality of event behaviors.

The detection of event behaviors can be performed as part of a system, such as the event detection system 170, described with reference to FIG. 3. The event detection system 170 can include the event determination module 330. The event determination module 330 can generally include instructions that function to control the processor 110 to select a plurality of event behaviors from the plurality of vehicle behaviors. The event behaviors can be substantially similar to the event behaviors, described with reference to FIGS. 3 and 4. The event behaviors can be stored as part of the detection data 360. The detection data 360 can be stored in a database, such as the database 310, described with reference to FIG. 3.

A predicted event can then be formulated based on the plurality of event behaviors, at 606. Once the plurality of event behaviors have been extracted from the plurality of vehicle behaviors, the method 600 can then establish possible events. The determination of possible events can be based on sensor data (e.g., an object detected in the road), extrapolation from actions (e.g., the vehicles maneuvered as if to dodge a pothole), or others. In one embodiment, there may be more than one predicted event (e.g., there may be construction or snow blocking the right hand lane) or the predicted event may be generic (e.g., an object in the middle lane). In further, embodiments, the predicted event can be refined over time, using new information, such as from publically available sources, sensor data or others.

The determination of the predicted event can be performed as part of a system, such as the event detection system 170, described with reference to FIG. 3. The event detection system 170 can include the event determination module 330. The event determination module 330 can further include instructions to formulate a predicted event based on the plurality of event behaviors. The predicted event can be substantially similar to the predicted event, described with reference to FIGS. 3 and 4. The event behaviors can inform the event detection system 170 regarding one or more types of event which correspond to the behavior. The predicted event can be stored as part of the event information 370. The event information 370 can be stored in a database, such as the database 310, described with reference to FIG. 3.

The predicted event and an event location can then be associated in the vehicular environment, at 608. Here, the response module can position the predicted event in an event location. The event location can be substantially similar to the event location described with reference to FIG. 3. The event location can be defined both by the vehicle behaviors and the predicted event, as described with reference to FIGS. 3 and 4. The predicted event can then be positioned, based on knowledge level about the event and changes over time, in the event locations. This association can then be provided to the plurality of detecting vehicles, other autonomous vehicles, other manual vehicles (such as through a communication system 131 or an augmented reality system 180) or other mechanisms. The method 600 can then use the predicted event to update a map, including any known time frames. Further, the method 600 can correlate the predicted event and the event location to other predicted or known events. The response module can use parameters such as type of event, timing, location, and others to determine that events are associated in the vehicular environment. The method 600 can detect an event involving a vehicle type within specific distance of the predicted event, thus determining that the detected event and the predicted event are related events. Further correlations between the predicted event and the vehicular environment can be formed.

The association of the predicted event can be performed as part of a system, such as the event detection system 170, described with reference to FIG. 3. The event detection system 170 can include the response module 340. The response module 340 can generally include instructions that function to control the processor 110 to associate the predicted event and an event location in the vehicular environment. The predicted event can be substantially similar to the predicted event, described with reference to FIGS. 3 and 4.

The predicted event and the event location can be stored as part of the event information 370. The event information 370 can be stored in a database, such as the database 310, described with reference to FIG. 3.

A guidance input can then be formulated for a recipient vehicle, using the predicted event and the event location, at 610. The guidance input is one or more steps which the operator or the autonomous vehicle can take to avoid being affected by the predicted event. The guidance input can be related to the type of event, the predicted effects of the event on traffic in the vehicular environment, the likelihood that the predicted event will be cleared, the location of the event, the availability of alternative routes, and others. The guidance input can include a specific route, lanes to avoid or position in, expectations regarding traffic patterns, traffic movements outside of normal lane patterns, or others. Further, the guidance input can include related temporal data collected over time, such as specific events, lane level events which occur with some known frequency or others.

The formulation of guidance input can be performed as part of a system, such as the event detection system 170, described with reference to FIG. 3. The event detection system 170 can include the response module 340. The response module 340 can further include instructions to formulate, using the predicted event and the event location, a guidance input for a recipient vehicle. The guidance input can be substantially similar to the guidance input, described with reference to FIGS. 3 and 4. The guidance input can be transmitted to a vehicle or an operator, as described in FIG. 3.

Finally, a recipient vehicle can then be navigated using the guidance input, at 612. The method 600 can include human level or autonomous vehicle level guidance of the vehicle using the guidance input. The guidance input can be delivered through or to the one or more systems of the vehicle. In one embodiment, the method 600 can directly take control of the vehicle, such as when the guidance input is presented as instructions to a vehicle and controls one or more movements therein. In another embodiment, the method 600 can indirectly control the vehicle, such as when the guidance input is presented as instructions to an autonomous system. In another embodiment, the guidance input can be presented as an option for the operator or passenger to act on, such as when the guidance input is presented to an operator as instructions/route, or when presented as inputs which can be selected or provided by a passenger.

The navigation using the guidance input can be performed as part of a system, such as the event detection system 170, described with reference to FIG. 3. The event detection system 170 can include the response module 340. The response module 340 can navigate the vehicle either directly or indirectly based on operator input, vehicle type or other control factors. The guidance input can be substantially similar to the guidance input, described with reference to FIGS. 3 and 4. The guidance input can be transmitted to a vehicle or an operator, as described in FIG. 3.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from an operator (e.g., a human user/driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing devices to control the vehicle 100 with minimal or no input from an operator. In one or more embodiments, the vehicle 100 is highly automated or completely automated. In one embodiment, the vehicle 100 is configured with one or more semi-autonomous operational modes in which one or more computing devices perform a portion of the navigation and/or maneuvering of the vehicle along a travel route, and a vehicle operator provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the operator is to monitor the driving and be vigilant and ready to intervene with controlling the vehicle 100 if the autonomous driving module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include map data 116 and/or sensor data 119. In this context, "map data" refers to any data providing relative proximity between two objects, usable by the vehicle 100, one or more systems of the vehicle 100, or the operator. "Sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, one or more cameras 126 and/or inertial measurement units (IMUs) 127. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator in order to determine a gaze of the operator, an eye track of the operator, and so on.

The vehicle 100 can include an input system 130. An "input system" includes any device, component, system, element or arrangement or groups thereof that enable information/data to be entered into a machine. The input system 130 can receive an input from a vehicle passenger (e.g., an operator or a passenger) or from external systems, such as from the event detection system 170, described above with reference to FIG. 2. The vehicle 100 can include an output system 135. An "output system" includes any device, component, or arrangement or groups thereof that enable information/data to be transmitted to the vehicle or presented to a vehicle passenger (e.g. a person, a vehicle passenger, etc.). The output system 135 can be configured to communicate sensor data and other information to the event detection system 170, as described above.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the event detection system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the event detection system 170, and/or the autonomous driving module(s) 160 may control some or all of these vehicle systems 140 and, thus, may be partially or fully autonomous.

The processor(s) 110, the event detection system 170, and/or the autonomous driving module(s) 160 can be operably connected to communicate with the various vehicle systems 140 and/or individual components thereof. For example, returning to FIG. 1, the processor(s) 110, the event detection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the event detection system 170, and/or the autonomous driving module(s) 160 may control some or all of these vehicle systems 140.

The processor(s) 110, the event detection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the event detection system 170, and/or the autonomous driving module(s) 160 can control the direction and/or speed of the vehicle 100. The processor(s) 110, the event detection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the event detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140). The noted functions and methods will become more apparent with a further discussion of the figures.

The vehicle 100 can further include an augmented reality (AR) system 180. It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real-world, and/or a combination of the two. In one embodiment, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the event detection system 170. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. An event detection system for determining vehicle position, comprising:
   one or more processors; and
   a memory communicably coupled to the one or more processors and storing instructions that when executed by the one or more processors cause the one or more processors to:
      collect, using a plurality of vehicles, detection data about a plurality of vehicle behaviors in a vehicular environment, the vehicle behaviors including positions and maneuvers collected from the plurality of vehicles indicating road position and changes therein over a period of time, the vehicle behaviors indicating which lane a vehicle was in, avoidance maneuvers, type of control of the vehicle, and time frames for both positions and maneuvers, whereby the vehicle behaviors are used to indicate choices made in the vehicular environment due to one or more temporal events;
      select a plurality of event behaviors from the plurality of vehicle behaviors, the plurality of event behaviors comprising a temporal connection, the temporal connection being a time-based association between the plurality of event behaviors indicating that the plurality of event behaviors are related to the same event;
      formulate a predicted event based on the plurality of event behaviors;
      associate the predicted event and an event location in the vehicular environment;
      formulate, using the predicted event and the event location, a guidance input for a recipient vehicle, the guidance input including one or more steps to avoid or safely traverse the predicted event; and
      navigate a recipient vehicle using the guidance input including one of:
         directly controlling one or more movements of the vehicle; and
         presenting instructions to an autonomous vehicle or a human operator for selective implementation.

2. The event detection system of claim 1, wherein the detection data comprises crowdsourced information compiled from one or more sensors of the plurality of vehicles.

3. The event detection system of claim 1, wherein the temporal connection is related to time component between an initial vehicle movement and a second vehicle movement.

4. The event detection system of claim 1, wherein the memory includes further instructions that when executed by the one or more processors cause the one or more processors to:
   determine a time frame for the predicted event.

5. The event detection system of claim 1, wherein the memory includes further instructions that when executed by the one or more processors cause the one or more processors to:
   update a temporal map using the predicted event and the event location.

6. The event detection system of claim 1, wherein the memory includes further instructions that when executed by the one or more processors cause the one or more processors to:
   modify the predicted event using information from a secondary source.

7. The event detection system of claim 1, wherein a set of boundaries for the event location are defined by the predicted event.

8. The event detection system of claim 1, wherein the guidance input includes lane level guidance for avoiding or traversing the event location.

9. A non-transitory computer-readable medium for determining vehicle position and storing instructions that when executed by one or more processors cause the one or more processors to:
   collect, using a plurality of vehicles, detection data about a plurality of vehicle behaviors in a vehicular environment, the vehicle behaviors including positions and maneuvers collected from the plurality of vehicles indicating road position and changes therein over a period of time, the vehicle behaviors indicating which lane a vehicle was in, avoidance maneuvers, type of control of the vehicle, and time frames for both positions and maneuvers, whereby the vehicle behaviors are used to indicate choices made in the vehicular environment due to one or more temporal events;
   select a plurality of event behaviors from the plurality of vehicle behaviors, the plurality of event behaviors comprising a temporal connection, the temporal connection being a time-based association between the plurality of event behaviors indicating that the plurality of event behaviors are related to the same event;
   formulate a predicted event based on the plurality of event behaviors;
   associate the predicted event and an event location in the vehicular environment;
   formulate, using the predicted event and the event location, a guidance input for a recipient vehicle, the guidance input including one or more steps to avoid or safely traverse the predicted event; and navigate a recipient vehicle using the guidance input including one of:
   directly controlling one or more movements of the vehicle; and
   presenting instructions to an autonomous vehicle or a human operator for selective implementation.

10. The non-transitory computer-readable medium of claim 9, wherein the detection data comprises crowdsourced information compiled from one or more sensors of the plurality of vehicles.

11. The non-transitory computer-readable medium of claim 9, wherein the temporal connection is related to time component between an initial vehicle movement and a second vehicle movement.

12. The non-transitory computer-readable medium of claim 9, further comprising instructions to determine a time frame for the predicted event.

13. The non-transitory computer-readable medium of claim 9, further comprising instructions to update a temporal map using the predicted event and the event location.

14. The non-transitory computer-readable medium of claim 9, further comprising instructions to modify the predicted event using information from a secondary source.

15. The non-transitory computer-readable medium of claim 9, wherein the guidance input includes lane level guidance for avoiding or traversing the event location.

16. A method for determining vehicle position, comprising:
   collecting, using a plurality of vehicles, detection data about a plurality of vehicle behaviors in a vehicular environment, the vehicle behaviors including positions and maneuvers collected from the plurality of vehicles indicating road position and changes therein over a period of time, the vehicle behaviors indicating which lane a vehicle was in, avoidance maneuvers, type of control of the vehicle, and time frames for both positions and maneuvers, whereby the vehicle behaviors are used to indicate choices made in the vehicular environment due to one or more temporal events;
   selecting a plurality of event behaviors from the plurality of vehicle behaviors, the plurality of event behaviors comprising a temporal connection, the temporal connection being a time-based association between the plurality of event behaviors indicating that the plurality of event behaviors are related to the same event;
   formulating a predicted event based on the plurality of event behaviors;
   associating the predicted event and an event location in the vehicular environment;
   formulating, using the predicted event and the event location, a guidance input for a recipient vehicle, the guidance input including one or more steps to avoid or safely traverse the predicted event; and
   navigating a recipient vehicle using the guidance input including one of:
      directly controlling one or more movements of the vehicle; and
      presenting instructions to an autonomous vehicle or a human operator for selective implementation.

17. The method of claim 16, wherein the detection data comprises crowdsourced information compiled from one or more sensors of the plurality of vehicles.

18. The method of claim 16, wherein the temporal connection is related to time component between an initial vehicle movement and a second vehicle movement.

19. The method of claim 16, further comprising instructions to update a temporal map using the predicted event and the event location.

20. The method of claim 16, wherein the guidance input includes lane level guidance for avoiding or traversing the event location.

* * * * *